3,733,228
Patented May 15, 1973

1

3,733,228
METHOD OF MANUFACTURE OF GLASS FIBER REINFORCED EPOXY RESIN TUBES
Ludwig Wesch, Heidelberg, Germany, assignor to Manufacture de Machines du Haut-Rhin S.A., Mulhouse-Bourtzwiller, France
No Drawing. Filed Feb. 27, 1970, Ser. No. 15,195
Claims priority, application France, Mar. 7, 1969, 6906540
Int. Cl. B65h 81/06
U.S. Cl. 156—172                8 Claims

ABSTRACT OF THE DISCLOSURE

Glass fiber reinforced epoxy resin tubes can be mass produced by winding glass fibers or filaments upon a mandrel at a high linear speed, preparing an epoxy resin which has a controlled viscosity of 400 to 900 cp. with an epoxy equivalent of 120 to 180 by mixing a more viscous epoxy resin with additives including reactive diluents which have a viscosity of 3.5 to 200 cp., an ebullition temperature of 120-30° C., and an epoxy equivalent of 70 to 180, and applying such prepared mixture to the filaments being wound. The additives may include hardeners, accelerators, and silanes. A layer of soft, uncured epoxy resin may be applied to the winding as the winding operation continues, or a layer of roving may be applied to the winding during the winding operation.

---

This invention relates to a method of production of glass fiber or filament reinforced epoxy resin tubes.

The mass production of glass fiber or filament reinforced epoxy resin tubes can be successfully carried out only if all the components employed in their manufacture are in such form that they permit high speed winding of the filaments. Previously, no attention was paid to internal correlations of the components in the mass production of such tubes. Instead, the components necessary to their manufacture were chosen only from the point of view of the efficacy of the resin or its hardness; no attention was paid to the viscosity of the resin or of the hardeners.

In accordance with the present invention, to the contrary, a high speed of manufacture of tubes of the type indicated is obtained, by special measures to be described which assure a high degree of moldability of the impregnated glass fibers and an accelerated impregnation by the resin of the fibers employed.

In a known prior method, the speeds of winding are higher than 10 m./min. and at a maximum are 120 m./min. Such high speeds do not permit the roving of filaments to be impregnated directly in a bath of resin because at such speeds of winding of the filaments a very large quantity of air becomes trapped in the resin mixture. For this reason, it is necessary to carry out the impregnation of the filaments indirectly by the use of rollers. But then the roving is in contact with the resin mixture for only a very short time; this does not permit the use of normal resins in such process. As a result, at present there are employed in such process epoxy resins having a viscosity of 1,000 to 10,000 centipoises (cp.). Frequently, mixtures of different resins are used; in addition, there may be employed hardeners in a solid state. These must be dissolved in the resin, as by heating the resin, or in some other manner. It is true that the heating of very viscous mixtures reduces their viscosity, but there is a risk of having the resins harden rapidly during the manufacturing operations.

In accordance with the present invention, winding at aforedescribed high speed is made possible without hearing by the use of epoxy resins having a predetermined

2 viscosity of from 400 to 900 cp. with an epoxy equivalent of from 120 to 180. The viscosity employed in a particular winding operation is arrived at in a purely chemical manner by the use of additives including reactive diluents which have viscosities from 3.5 to 200 cp. Their ebullition temperature is from 120 to 300° C., and they have an epoxy equivalent of from 70 to 180. The extremely low viscosity of the reactive diluents, taken with their ebullition points, permits desired hardness properties to be given to the final product.

If tubes which are to be subjected only to small loads are mass produced in accordance with the invention, a lower hardening temperature is sufficient. In this case, reactive diluents with a low ebullition point are used, for example, diluent B made by Rütgerswerke of Frankfurt, Germany. If tubes which are subjected to large loads are mass produced in accordance with the invention, such tubes having a Martens temperature of 110° C. and above, reactive diluents BD and P, likewise made by Rütgerswerke, are particularly satisfactory.

The reactive diluent which is added to the epoxy resins is not the only factor which gives the resin good properties with regard to its impregnation of the wound filaments. According to the invention, it is also necessary that the hardeners have a viscosity comparable to that of the base resin mixture. As hardeners for the mass production of tubes in accordance with the invention, good results have been obtained with aliphatic amines and with aromatic amines, although they must be carefully used because they are sometimes noxious. Because of this, it is preferred that hardeners of the anhydride type be used. All of the hardeners used in the practice of the present invention must have a viscosity of from 10 to 500 cp. such upper limit must not be exceeded if the resulting resin mixture is to be used easily and rapidly, and if the impregnation of the filaments is to be satisfactory.

Two hardening accelerators have proved to give particularly good results in the practice of the present invention when acceleration of the hardening is desired in the mass production of tubes; such accelerators may be used singly or mixed with each other. These accelerators are dimethylaminomethylphenol and 2,4,6-tris-(dimethylaminomethylphenol). The percentage of these accelerators can be varied according to the speed of hardening desired; they can be used in an amount of from 0.1 to 5% by weight of the mixture of resin and hardener. The most frequently used amount is 1% on the above basis. When a mixture of the above two phenol accelerators is used, it is preferred that equal amounts by weight be used.

When the winding speed of the filaments is high, for example, near 120 m./min., the surfaces of the individual filaments of the roving are scuffed and otherwise damaged by their passage through eyelets and guide combs, and the like. As a result, the final layer of the product is injured. In order to obtain final products with very good mechanical properties, the products can be repaired by using silanes in the resin-hardener mixture. Numerous ones of the silanes may be used for this purpose. Silanes such as beta-(3,4-epoxycyclohexyl)-ethyl-trimethoxysilane and γ-aminopropyl-triethoxysilane are preferred in the practice of the present invention.

The above-described methods yield mass produced tubes which are entirely satisfactory when they are not to be subjected to any substantial compression. For tubes to be used under pressure, however, it is necessary to take further appropriate measures. When the reinforcing filaments or fibers employed are filaments of polyester connected by an acrylic ester copolymerization product, as well as by the above-described resin mixture, the resulting tubes not only have a very substantially increased bursting strength but also an improved resistance to wear by the passage of hard abrasive material therethrough. A similar effect in increasing the wear resistance of the tubes is produced by using a layer of epoxy resin which contains an epoxy resin with inner plastification, for example, resin 0256 (which has a viscosity of 2400 to 2800 cp.) with hardener N (Rütgerswerke, Frankfurt).

The following example illustrates the making of a tube in accordance with the invention:

(1) Layer 1 applied directly to the winding mandrel: a fleece or roving of polyester fibers, 20 g./m.$^2$, double thickness of the mixture of resin and hardener set out in (2), below.

(2) Wound layer of filaments:

resin: 0502 of Rütgerswerke which includes the reactive diluents B & BD and which has a viscosity in the range of 400 and 800 cp., 50 parts by weight
hardener: HT Rütgerswerke, 50 parts by weight
dimethylaminoethylphenol: 1 part by weight In place of the fleece or roving, in the above example, there may be used, instead of the fleece, a layer of gel having the following composition:

resin: 0256, 140 parts by weight
hardener: N, 19.6 parts by weight

As other underlayers, there may be used layers of polyvinyl chloride, or polyethylene or copolymerization products of butadiene and acrylonitrite.

The exact method of applying the winding adopted depends upon the use to which the tube is to be put. The filaments may be applied by cross winding: they may also be applied by employing a spiral winding and at the same time further filaments disposed parallel to the axis of the tube. It is also possible to use a combination of alternating spiral and cross windings of the filaments, the number of winding layers employed depending upon the properties which the tube must have to fill its conditions of use. Such conditions of use, dictate whether the longitudinal strength, radial strength, or both of the tube is to be increased.

Tubes manufactured by the above-disclosed method can be used wherever tubes are to be employed. They may be used for conveying oil, as pressure tubes, or in chemical industries wherein they are subjected to severe service conditions. Another field of use of the tubes is as the body of a fusee, or the tubular bodies of lances and rockets.

Although the invention is illustrated and described with reference to a plurality of preferred embodiments thereof, it is to be understood that it is in no way limited to the disclosure of such plurality of embodiments, but is capable of numerous modifications according to the appended claims.

What is claimed is:

1. A method of production of glass filaments reinforced epoxy resin tubes, comprising winding the filaments upon a mandrel at a linear speed of from 10 to 120 m./min., preparing an epoxy resin which has a controlled viscosity of 400 to 900 cp. with an epoxy equivalent of 120 to 180 by mixing a more viscous epoxy resin of a viscosity of 1000 to 10,000 cp. with additives including reactive diluents which have a viscosity of 3.5 to 200 cp., an ebullition temperature of 120–300° C., and an epoxy equivalent of 70 to 180, and applying such prepared mixture to the filaments before being wound.

2. A method according to claim 1, wherein said additives include at least one hardener having a viscosity of 10 to 500 cp.

3. A method according to claim 2, wherein said hardener is chosen from the group consisting of aliphatic and aromatic amines, and anhydrides.

4. A method according to claim 3, wherein said additives include a hardening accelerator.

5. A method according to claim 4, wherein said accelerator is chosen from the group consisting of dimethylaminomethylphenol, 2,4,6-tris-(dimethylaminomethyl)-phenol, and mixtures of such last two compounds.

6. A method according to claim 2, wherein said additives include silanes in an amount from 0.1 to 5% by weight of the mixture of epoxy resins and hardeners.

7. A method according to claim 1, comprising applying a soft layer of epoxy resin to the winding as the winding operation continues.

8. A method according to claim 1, comprising applying a layer of roving to the winding as the winding operation continues.

References Cited
UNITED STATES PATENTS

| | | | |
|---|---|---|---|
| 3,562,081 | 2/1971 | Stalego | 161—93 |
| 3,526,557 | 9/1970 | Taylor, Jr. | 156—174 X |
| 3,476,693 | 11/1969 | Mango et al. | 156—330 X |
| 3,297,186 | 1/1967 | Wells | 156—330 X |
| 3,240,644 | 3/1966 | Wolff | 156—172 X |
| 3,168,544 | 2/1965 | Jex | 156—330 X |
| 3,240,736 | 3/1966 | Beckwith | 156—330 X |
| 2,837,497 | 6/1958 | Delmonte | 156—330 UX |

CARL D. QUARFORTH, Primary Examiner

E. E. LEHMANN, Assistant Examiner

U.S. Cl. X.R.

138—172; 156—175, 330; 161—93